US008587208B2

(12) United States Patent
Kumar et al.

(10) Patent No.: US 8,587,208 B2
(45) Date of Patent: Nov. 19, 2013

(54) MULTIPLE STRIKE BALLAST FOR ELECTRODELESS LAMP

(75) Inventors: Nitin Kumar, Burlington, MA (US); Shashank Bakre, Woburn, MA (US); Ayan Choudhury, Danvers, MA (US)

(73) Assignee: Osram Sylvania Inc., Danvers, MA (US)

( * ) Notice: Subject to any disclaimer, the term of this patent is extended or adjusted under 35 U.S.C. 154(b) by 92 days.

(21) Appl. No.: 13/460,438

(22) Filed: Apr. 30, 2012

(65) Prior Publication Data

US 2012/0274229 A1 Nov. 1, 2012

Related U.S. Application Data

(60) Provisional application No. 61/481,018, filed on Apr. 29, 2011.

(51) Int. Cl.
*H05B 37/02* (2006.01)

(52) U.S. Cl.
USPC ....... 315/209 R; 315/224; 315/247; 315/291; 315/307

(58) Field of Classification Search
None
See application file for complete search history.

(56) References Cited

U.S. PATENT DOCUMENTS 6,181,083 B1 1/2001 Moisin
7,015,652 B2 * 3/2006 Shi ................................ 315/224
7,315,130 B1 1/2008 Chen et al.
8,018,173 B2 * 9/2011 Shackle et al. ............ 315/209 R
8,362,701 B2 * 1/2013 Yao et al. ...................... 315/158
2003/0117084 A1 * 6/2003 Stack ............................ 315/224
2005/0093477 A1 * 5/2005 Shi ................................ 315/224
2007/0164684 A1 7/2007 Blair et al.
2008/0054816 A1 * 3/2008 Shackle et al. ............ 315/209 R
2008/0278085 A1 11/2008 Yu et al.
2010/0194305 A1 8/2010 Makimura et al.
2012/0001556 A1 * 1/2012 Newman et al. .............. 315/182
2012/0313538 A1 * 12/2012 Kumar et al. ............. 315/200 R

FOREIGN PATENT DOCUMENTS

JP 11-503266 A 3/1999

OTHER PUBLICATIONS

Chang Rag Choi, International Search Report and Written Opinion of the International Searching Authority for PCT/ US12/35868, Nov. 5, 2012, pp. 1-7, Korean Intellectual Property Office, Daejeon Metropolitan City, Republic of Korea.

* cited by examiner

*Primary Examiner* — Jany Richardson
(74) *Attorney, Agent, or Firm* — Shuan P. Montana

(57) ABSTRACT

A multi-strike ballast to ignite an electrodless lamp is disclosed, and includes an inverter circuit, an output voltage detection circuit (OVDC), and an inverter shutdown circuit. The inverter circuit, upon activation, sends an ignition pulse to the electrodeless lamp. The inverter circuit shut downs upon receiving a deactivation signal, and activates upon receiving an activation signal, triggering another ignition pulse. The OVDC detects an output voltage across the lamp. The inverter shutdown circuit includes a multi-strike diac and receives the detected output voltage. The multi-strike diac breaks upon the output voltage reaching a predetermined level. In response, a deactivation signal is sent to the inverter circuit. The multi-strike diac turns off upon the output voltage falling below the predetermined level. In response, an activation signal is sent to the inverter circuit, triggering a further ignition pulse. The process repeats, providing multiple ignition pulses to the lamp.

13 Claims, 2 Drawing Sheets

MULTIPLE STRIKE BALLAST FOR ELECTRODELESS LAMP

CROSS-REFERENCE TO RELATED APPLICATION

The present application claims priority of U.S. Provisional Application No. 61/481,018, filed Apr. 29, 2011 and entitled "MULTIPLE STRIKE BALLAST FOR ELECTRODELESS LAMP", the entire contents of which are hereby incorporated by reference.

TECHNICAL FIELD

The present invention relates to lighting, and more specifically, to electronic ballasts that power low pressure discharge lamps.

BACKGROUND

An electrodeless gas discharge lamp system includes an inductively coupled electrodeless fluorescent lamp and a high frequency ballast. Electrodeless gas discharge lamp systems use electromagnetic induction, instead of electrodes, to spark a discharge to ignite the plasma within the lamp, causing the lamp to emit light. Electrodes found in a typical fluorescent lamp can limit the life of the lamp. Since the electrodeless gas discharge lamps do not include electrodes, the electrodeless gas discharge lamps provide many of the same benefits as fluorescent lamps with electrodes, while additionally providing a longer lamp life.

Multiple electrodeless gas discharge lamps are commonly used to illuminate a single location. A single high frequency ballast is typically used to power each electrodeless gas discharge lamp, by providing an ignition strike to ignite the plasma within the lamp.

SUMMARY

A typical electrodeless lamp ballast provides only a single ignition strike to the electrodeless lamp. If the single ignition strike fails to ignite the lamp, the ballast shuts down. More particularly, in a typical ICETRON® ballast made by OSRAM SYLVANIA Inc., the ballast will shut off the self resonating inverter that generates the ignition strike. A further ignition strike is generated only if the power to the ballast is switched off, and then back on. However, electrodeless lamps are typically used in applications where it is inconvenient at best, and almost impossible at worst, to repeatedly switch power to the ballast off and on again. Such applications include, but are not limited to, street lighting applications, tunnel lighting applications, and the like.

A further complication to using only a single strike to ignite an electrodeless lamp is that it is hard to start an electrodeless lamp in a dark environment (i.e., one with little or no other light). An electrodeless lamp, as is well known in the art, requires photons and free electrons to initiate the discharge, causing the lamp to ignite. Only free electrons (and ions) can be acted upon by the electric field within the lamp. Free electrons are constantly created by cosmic rays and the Earth's natural radiation. This process is highly random and the equilibrium between free electron creation and losses due to recombination and to the walls of the lamp leaves few free electrons. Free electrons are also created by photoemission of the phosphor. This process creates more free electrons. Therefore, a lamp in the presence of light, which can rely on cosmic radiation and photoemission to create free electrons, will start more easily than a lamp in a dark environment, which can only rely on the randomness of cosmic radiation.

Embodiments described herein provide for a ballast that provides an electrodeless lamp with multiple ignition strikes, until the lamp ignites, or until the lamp breaks, without a user having to toggle input power to the ballast. If a first ignition strike of the electrodeless lamp by its ballast fails to ignite the lamp, an excess of free electrons and ions created in part by the failed ignition strike should help to make a successive ignition strike successful. The more failed strikes, the greater the amount of excess free electrons and ions to assist later ignition strikes, and the more likely a successive strike will ignite the lamp.

In an embodiment, there is provided a multi-strike ballast to ignite an electrodless lamp. The multi-strike ballast includes: an inverter circuit configured to send an ignition pulse to the electrodeless lamp following activation of the inverter circuit, to shut down upon receiving a deactivation signal, and to activate upon receiving an activation signal; an output voltage detection circuit configured to detect an output voltage across the electrodeless lamp; and an inverter shutdown circuit, wherein the inverter shutdown circuit includes a multi-strike diac, and wherein the inverter shutdown circuit is configured to receive the output voltage from the output voltage detection circuit, to break the multi-strike diac upon the output voltage reaching a predetermined level and in response to send a deactivation signal to the inverter circuit, and to turn off the multi-strike diac upon the output voltage falling below the predetermined level and in response to send an activation signal to the inverter circuit.

In a related embodiment, the inverter circuit may include a switch, wherein the switch may be configured to control activation and deactivation of the inverter circuit and the ignition pulses sent thereby, wherein the multi-strike diac may include a first terminal and a second terminal, and wherein the inverter shutdown circuit may further include: an RC circuit connected to the first terminal of the multi-strike diac; a resistive divider circuit connected to the second terminal of the multi-strike diac; a multi-strike capacitor connected to the resistive divider and configured to charge upon the breaking of the multi-strike diac and to discharge upon the turning off of the multi-strike diac; and a multi-strike switch connected to the multi-strike capacitor and to the switch of the inverter circuit, wherein the multi-strike switch maybe configured to turn on in response to the charging of the multi-strike capacitor to a threshold voltage and in response to short the switch of the inverter circuit, thereby deactivating the inverter circuit, and may be configured to turn off in response to the discharging of the multi-strike capacitor below the threshold voltage and in response to un-short the switch of the inverter circuit, thereby activating the inverter circuit. In a further related embodiment, the RC circuit may include a detection capacitor configured to receive the detected output voltage of the electrodeless lamp and to charge to the predetermined level, wherein the detection capacitor may be connected to the first terminal of the multi-strike diac. In another further related embodiment, the switch of the inverter may be a transistor, the transistor may include a gate, a source, and a drain, and the multi-strike switch may be configured to turn on in response to the charging of the multi-strike capacitor to the threshold voltage and in response to connect the gate of the transistor of the inverter circuit with the source of the transistor of the inverter circuit, thereby deactivating the inverter circuit, and may be configured to turn off in response to the discharging of the multi-strike capacitor below the threshold voltage and in response to disconnect the gate of the transistor of the inverter circuit with the source of the transistor of the inverter circuit, thereby activating the inverter circuit.

In yet another related embodiment, the output voltage detection circuit and the inverter shutdown circuit may together form a multiple ignition strike circuit.

In still another related embodiment, the output voltage detection circuit may include: a feedback capacitor connected to a first terminal of the electrodeless lamp; a first diode and a second diode in series, wherein the first diode and the second diode are in series with the feedback capacitor; a capacitor in series with a third diode; a feedback resistor in parallel with the capacitor and the third diode; and a fourth diode, wherein an anode of the fourth diode is connected between the capacitor and a cathode of the third diode. In a further related embodiment, the inverter circuit may include a switch, wherein the switch is configured to control activation and deactivation of the inverter circuit and the ignition pulses sent thereby, wherein the multi-strike diac may include a first terminal and a second terminal, and wherein the inverter shutdown circuit may further include: an RC circuit connected to the first terminal of the multi-strike diac; a resistive divider circuit connected to the second terminal of the multi-strike diac; a multi-strike capacitor connected to the resistive divider and configured to charge upon the breaking of the multi-strike diac and to discharge upon the turning off of the multi-strike diac; and a multi-strike switch connected to the multi-strike capacitor and to the switch of the inverter circuit, wherein the multi-strike switch may be configured to turn on in response to the charging of the multi-strike capacitor to a threshold voltage and in response to short the switch of the inverter circuit, thereby deactivating the inverter circuit, and may be configured to turn off in response to the discharging of the multi-strike capacitor below the threshold voltage and in response to un-short the switch of the inverter circuit, thereby activating the inverter circuit.

In another embodiment, there is provided a method of igniting an electrodeless lamp. The method includes: detecting a first output voltage of the electrodeless lamp, the electrodeless lamp having received a first ignition pulse from an activated inverter circuit; breaking a multi-strike diac upon the detected first output voltage reaching a predetermined level; deactivating the inverter circuit upon the multi-strike diac breaking; detecting a second output voltage of the electrodless lamp; turning off the multi-strike diac upon the detected second output voltage falling below the predetermined level; reactivating the inverter circuit upon the multi-strike diac turning off; and sending a second ignition pulse to the electrodeless lamp.

In a related embodiment, the method may further include repeating the steps of detecting, breaking, deactivating, detecting, turning off, reactivating, and sending, until the electrodeless lamp ignites.

In another related embodiment, detecting a first output voltage may include: detecting a first output voltage of the electrodeless lamp, the electrodeless lamp having received a first ignition pulse from an activated inverter circuit; and providing the detected first output voltage to charge a detection capacitor to the predetermined level, wherein the detection capacitor is connected to the multi-strike diac such that the multi-strike diac is also provided the detected first output voltage. In a further related embodiment, the method may further include: delaying breaking the multi-strike diac by an RC circuit, wherein the RC circuit comprises the detection capacitor and an a resistor.

In still another related embodiment, deactivating may include: charging a multi-strike capacitor to a gate threshold voltage; in response, turning on a multi-strike switch; and shorting a switch of the inverter such that the inverter is deactivated. In a further related embodiment, shorting may include: connecting a gate of the switch of the inverter with a source of the switch of the inverter.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Figure 1:
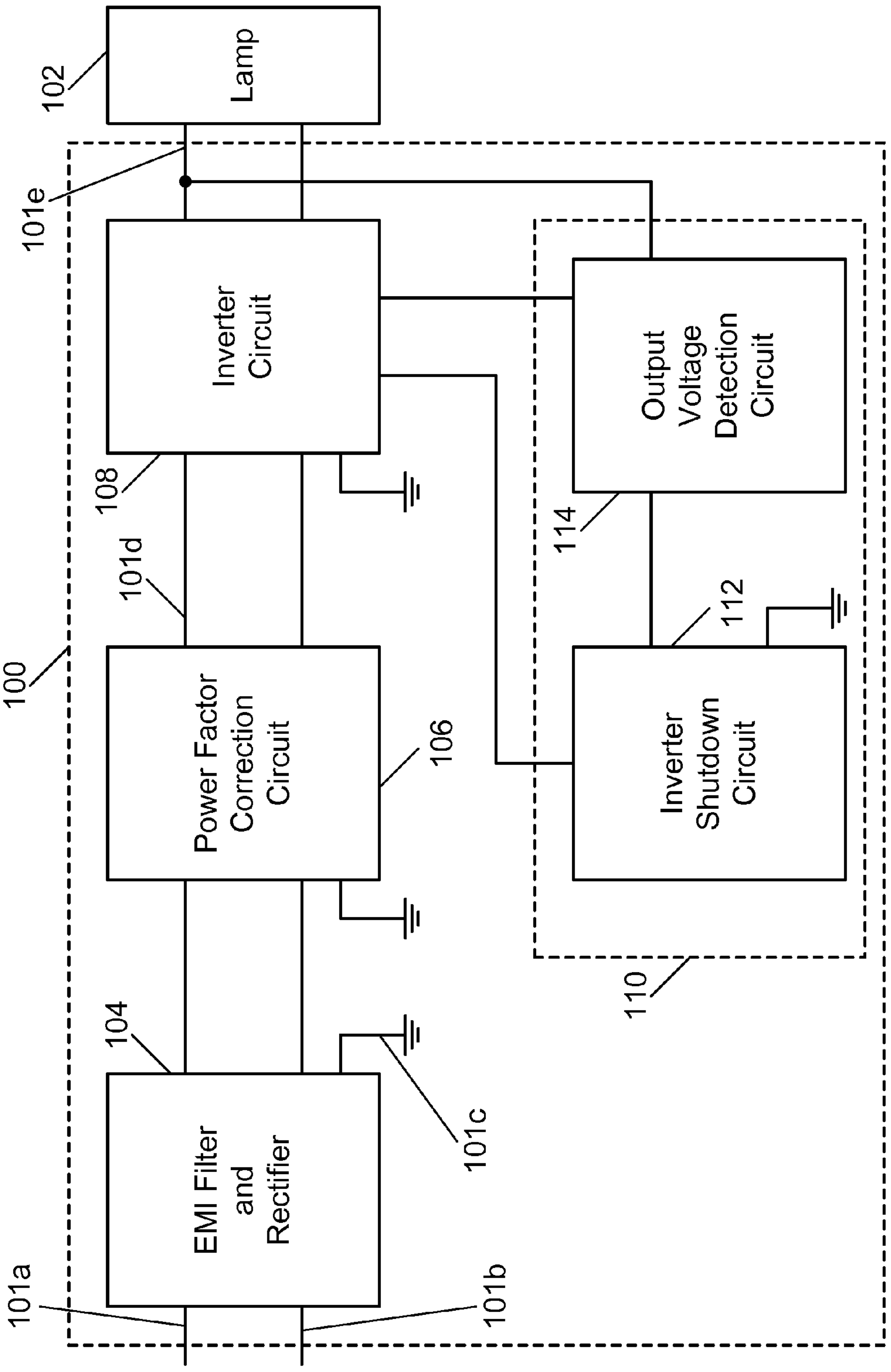
FIG. 1 shows a block diagram of a multi-strike ballast according to embodiments disclosed herein.

FIG. 1 shows a block diagram of a multi-strike ballast 100. The multi-strike ballast 100 is used to operate an electrodeless lamp 102, such as but not limited to an ICETRON® lamp made by OSRAM SYLVANIA Inc. Though embodiments may be described herein with reference to a single electrodeless lamp, of course multiple electrodeless lamps may also be operated. Further, though embodiments may be described herein with reference to a particular ballast, namely a 40 W ICETRON® ballast made by OSRAM SYLVANIA Inc., embodiments are not so limited and may be applied to any type of electrodeless lamp ballast operating any type of electrodeless lamp(s).

The multi-strike ballast 100 shown in FIG. 1 includes a high voltage input terminal (i.e., line voltage input terminal) 101*a* adapted to be connected to an alternating current (AC) power supply (e.g., standard 120V AC mainline power) (not shown in FIG. 1). The multi-strike ballast 101 also includes a neutral input terminal 101*b* and a ground terminal 101*c* connectable to ground potential. An input AC power signal is received by the multi-strike ballast 100 from the AC power supply via the high voltage input terminal 101*a*. The multi-strike ballast 100 also includes an electromagnetic interference (EMI) filter and rectifier (e.g., full-wave rectifier) 104, which are illustrated together in FIG. 1. The EMI filter portion of the EMI filter and rectifier 104 prevents noise that may be generated by the multi-strike ballast 100 from being transmitted back to the AC power supply. The rectifier portion of the EMI filter and rectifier 104 converts AC voltage received from the AC power supply to DC (direct current) voltage. Thus, the EMI filter and rectifier 104 outputs a DC voltage.

A power factor correction circuit 106, which may, in some embodiments, be a boost converter, is connected to the EMI filter and rectifier 104. The power factor correction circuit 106 receives the rectified DC voltage from the EMI filter and rectifier 104 and produces a high DC voltage on a high DC voltage bus 101*d*. For example, the power factor correction circuit 106 may provide a voltage of around 450 volts to the high DC voltage bus 101*d*. An inverter circuit 108 is connected to the power factor correction circuit 106 to provide a voltage to operate the electrodeless lamp 102, i.e. to ignite the electrodeless lamp 102 and ensure continued operation thereof. This voltage provided by the inverter circuit is referred to hereinafter as an output voltage 101*e*.

The multi-strike ballast 100, in some embodiments, also includes a multiple ignition strike circuit 110. In some embodiments, the multiple ignition strike circuit 110 includes an inverter shutdown circuit 112 and an output voltage detection circuit 114. In some embodiments, the multiple ignition strike circuit includes only the inverter shutdown circuit 112. The output voltage detection circuit 114 is connected so as to receive the output voltage 101*e* that is provided to the electrodeless lamp 102 from the inverter circuit 108. The output voltage detection circuit is also connected to the inverter circuit 108 as described in greater detail with regards to FIG. 2. The output voltage detection circuit 114 detects the voltage across the electrodeless lamp 102 and provides it to the inverter shutdown circuit 112.

The inverter shutdown circuit 112 is connected to the output voltage detection circuit 114 and the inverter circuit 108. As is described in greater detail below, the inverter shutdown circuit 112 receives the output voltage 101*e* as detected by the output voltage detection circuit 114. When the output voltage 101*e* rises above a predetermined level, the inverter shutdown circuit 112 sends a deactivation (i.e., shutdown) signal to the inverter circuit 108. This causes the inverter circuit 108 to cease sending an ignition pulse to the electrodeless lamp 102. The voltage across the electrodeless lamp 102 (i.e., the output voltage 101*e*) then falls, and this decrease is detected by the output voltage detection circuit 114. The output voltage detection circuit 114 sends the detected output voltage 101*e* to the inverter shutdown circuit 112. When the output voltage 101*e* falls below the predetermined level, the inverter shutdown circuit 112 sends an activation (i.e., turn on) signal to the inverter circuit 108. The inverter circuit 108 then turns on, and, as part of its typical activation process, sends an ignition pulse to the electrodeless lamp 102. These operations repeat unless the electrodeless lamp 102 ignites, at which point, under normal operation, the output voltage 101*e* as detected by the output voltage detection circuit 114 does not rise to the predetermined level and thus the inverter shutdown circuit 112 does not send an activation or deactivation signal, or both, to the inverter circuit 108.

Figure 2:
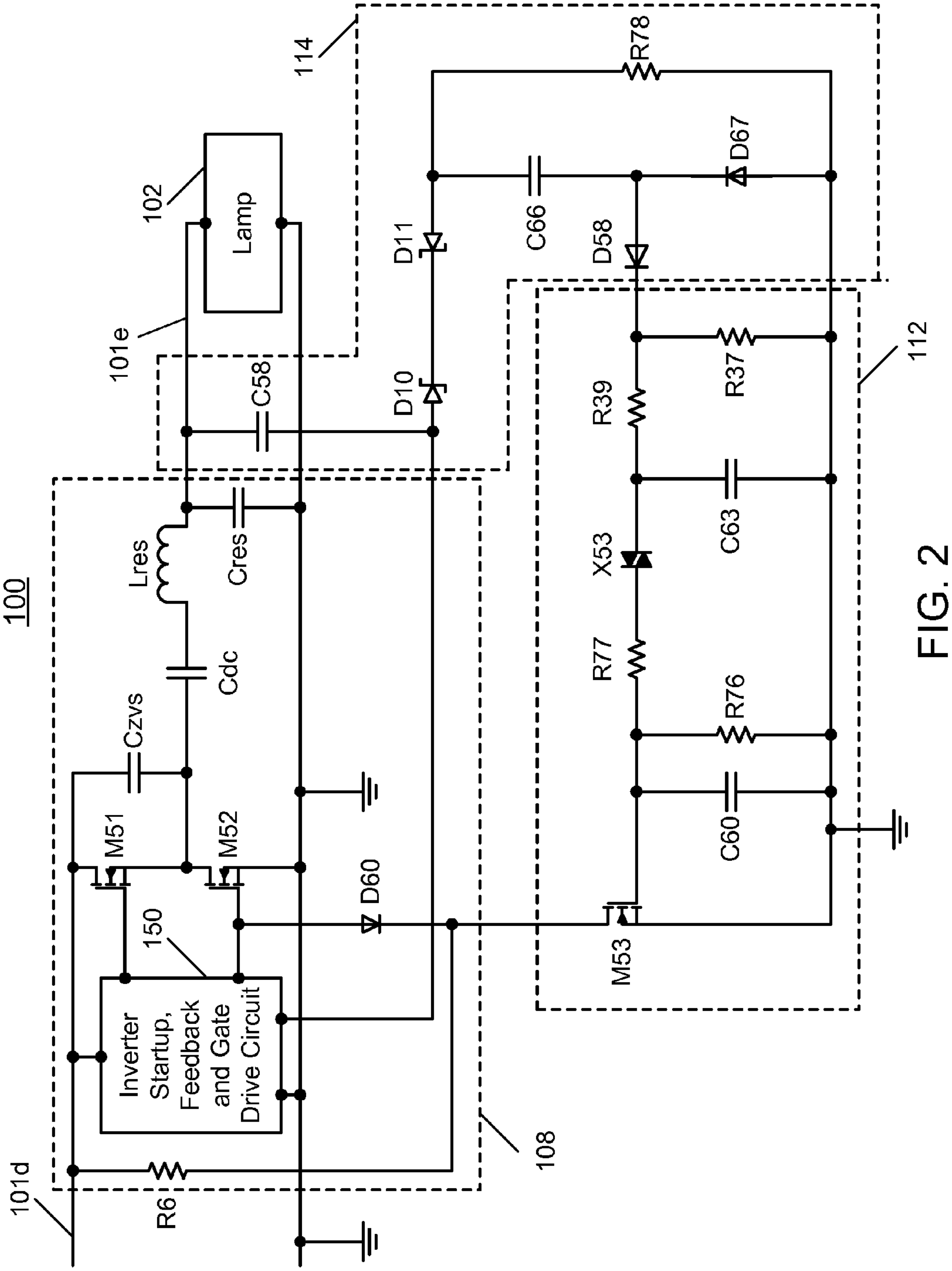
FIG. 2 shows a partial circuit diagram of a multi-strike ballast according to embodiments disclosed herein.

FIG. 2 shows a partial circuit diagram of a multi-strike ballast 100, which is in particular a 40 W ICETRON® ballast made by OSRAM SYLVANIA Inc. to which a multiple ignition strike circuit 110 (comprising an inverter shutdown circuit 112 and an output voltage detection circuit 114) has been added. FIG. 2 also shows the electrodeless lamp 102 which the multi-strike ballast 100 operates, the inverter circuit 108, and the high DC voltage bus 101*d* from the power factor correction circuit 106 shown in FIG. 1.

The inverter circuit 108 includes a resistor R6, an inverter startup, feedback and gate drive circuit 150, an inverter switch M52, a switch M51, a diode D60, a first inverter capacitor Czvs, a DC capacitor Cdc, a resonant inductor Lres, and a resonant capacitor Cres, connected as shown in FIG. 2 in a self-oscillating half bridge configuration, though of course other inverter configurations may be used. The output voltage 101*e* of the inverter circuit 108 is applied to the electrodeless lamp 102 and is detected by the output voltage detection circuit 114.

The output voltage detection circuit 114 includes a feedback capacitor C58, a first diode D10, a second diode D11, a capacitor C66, a third diode D67, a feedback resistor R78, and a fourth diode D58. The feedback capacitor C58 is connected to a first terminal of the electrodeless lamp 102. The first diode D10 is in series with the second diode D11, and the series combination thereof is in series with the feedback capacitor C58. A connection point between the feedback capacitor C58 and the series combination of the first diode D10 and the second diode D11 is connected to the inverter circuit 108, more specifically, the startup, feedback and gate drive circuit 150. The capacitor C66 is in series with the third diode D67. The other terminal of the capacitor C66 is connected to the anode of the second diode D11. The feedback resistor R78 is in parallel with the capacitor C66 and the third diode D67. The anode of the third diode D67 and a terminal of the feedback resistor R78 are connected to a ground potential. An anode of the fourth diode D58 is connected between the capacitor C66 and a cathode of the third diode D67. A cathode of the fourth diode D58 is connected to the inverter shutdown circuit 112 as described herein.

In some embodiments, as described above with regards to FIG. 1, the output voltage detection circuit 114 is part of the multiple ignition strike circuit 110 (shown in FIG. 1). Alternatively, the output voltage detection circuit 114 in some embodiments is not part of the multiple ignition strike circuit 110 (shown in FIG. 1). Alternatively, in some embodiments, a subset of components of the output voltage detection circuit 114 is part of the multiple ignition strike circuit 110 (shown in FIG. 1) while the remaining components are not.

The inverter shutdown circuit 112 includes, in some embodiments, a multi-strike switch M53, an RC circuit formed of a detection capacitor C63 and a resistor R37 and a resistor R39, a resistive divider circuit formed of a resistor R76 and a resistor R77, a multi-strike capacitor C60, and a multi-strike diac X53. The multi-strike diac X53 includes a first terminal and a second terminal. The RC circuit is connected to the cathode of the fourth diode D58 of the output voltage detection circuit 114 and to the first terminal of the multi-strike diac X53. More particularly, the resistor R37 is connected in series with the resistor R39, and the cathode of the fourth diode D58 is connected therebetween, that is, at a connection point joining a terminal of the resistor R37 and a terminal of the resistor R39. The detection capacitor C63 is in parallel across the series combination of the resistor R37 and the resistor R39. The other terminal of the resistor R37 and a terminal of the detection capacitor C63 connected thereto are connected to a ground potential. The other terminal of the detection capacitor C63 is connected to the other terminal of the resistor R39 and the first terminal of the multi-strike diac X53.

The second terminal of the multi-strike diac X53 is connected to the resistive divider circuit formed of the resistor R76 and the resistor R77. More specifically, the resistor R77 is connected between the second terminal of the multi-strike diac X53 and a terminal of the resistor R76. The other terminal of the resistor R76 is connected to a ground potential. A connection point between the resistor R76 and the resistor R77 (i.e., where the resistor R76 is connected to the resistor R77) is connected to the multi-strike capacitor C60. The other terminal of the multi-strike capacitor C60 is connected to a ground potential. In other words, the multi-strike capacitor C60 is in parallel with the resistor R76, as well as the capacitor C63, and the resistor R37, as shown in FIG. 2. The multi-strike switch M53 is connected to the multi-strike capacitor C60, to the inverter circuit 108, and to a ground potential. More specifically, the multi-strike switch M53 is an n-channel metal oxide field effect transistor (MOSFET or FET) having a gate, a source, and a drain. The gate of the multi-strike switch M53 is connected to the multi-strike capacitor C60. The drain of the multi-strike switch M53 is connected to the diode D60 of the inverter circuit 108, and the source of the multi-strike switch M53 is connected to the ground potential.

In operation, the inverter shutdown circuit 112 functions as follows. The output voltage detection circuit 114 detects the output voltage 101*e* across the electrodeless lamp 102. In situations when the electrodeless lamp 102 fails to ignite from an ignition pulse provided thereto from the inverter circuit

108, the output voltage detection circuit 114 detects a DC voltage (i.e., the output voltage 101*e*) that provided to the inverter shutdown circuit 112. More specifically, the inverter shutdown circuit 112 receives the detected output voltage 101*e*, which is high enough to charge the detection capacitor C63 of the inverter shutdown circuit 112 to a predetermined level. In some embodiments, this predetermined level is 32V and/or substantially 32V. Of course, in other embodiments, the capacitor C63 is selected to provide a different charging voltage maximum (i.e., predetermined level). This causes the multi-strike diac X53 to break. Of course, in other embodiments, the multi-strike diac X53 is selected to break at a different voltage (i.e., predetermined level), in line with the selection of the charging voltage of the capacitor C63 (i.e., predetermined level). The duration until the multi-strike diac X53 breaks is set by an RC time constant determined by the combination of the capacitor C63 and the resistors R37 and R39.

After the multi-strike diac X53 breaks, the multi-strike capacitor C60 is charged through the resistive divider formed of the resistors R76 and R77. When the multi-strike capacitor C60 is charged such that the voltage across the multi-strike capacitor C60 reaches a gate threshold voltage of the multi-strike switch M53, the multi-strike switch M53 turns on. The inverter switch M52 (also referred to herein as a "switch M52 of the inverter circuit 108") is also an n-channel MOSFET having a gate, a source, and a drain. When the multi-strike switch M53 turns on, this causes the gate of the inverter switch M52 in the inverter circuit 108 to short with its source via a diode D60. The short of the inverter switch M52 results in the shutdown (i.e., deactivation) of the inverter circuit 108, which kills (i.e., stops) the oscillations of the inverter circuit 108. In other words, the inverter circuit 108 ceases providing an operating voltage to the electrodeless lamp 102. As this occurs, the output voltage 101*e* across the electrodeless lamp 102 begins to fall. This fall in the output voltage 101*e* is detected by the output voltage detection circuit 114. As the detected output voltage falls below the predetermined level (e.g., 32V and/or substantially 32V), the multi-strike diac X53 turns off. When the diac X53 is turned off, the multi-strike capacitor C60 discharges and has a voltage below the threshold voltage level, and thus the corresponding gate voltage of the multi-strike switch M53 also falls below the threshold voltage level, turning off the multi-strike switch M53. This causes the inverter circuit 108 to activate (i.e., reactive, start), as the gate of the inverter switch M52 is no longer shorted to its source via the multi-strike switch M53 in its on state via the diode D60. As the inverter circuit 108 activates, it sends out an ignition pulse to the electrodeless lamp 102, as part of its usual startup operation. The above-described process repeats until the lamp is ignited, causing the lamp to (if necessary) receive multiple strikes from the inverter circuit 108 due to the multiple stops and (re-)starts (i.e., deactivations and (re-)activations) of the inverter circuit 108.

After the electrodeless lamp 102 is ignited, under normal operation, the output voltage 101*e* as detected by the output voltage detection circuit 114 is never high enough to break the multi-strike diac X53 (i.e., turn it on), and hence the multi-strike switch M53 always stays off with a DC voltage (i.e., a high DC bus voltage 101*d*) across it via a resistor R6 in the multi-strike ballast 100.

Note that, in a situation involving an electrodeless lamp that is broken, as opposed to an electrodeless lamp that requires more than one ignition strike to start, an electrodeless lamp ballast including a multiple strike ignition circuit as described herein where never stop sending ignition pulses to the electrodeless lamp. As the electrodeless lamp cannot be ignited, the voltage across the electrodeless lamp will never reach a state such that the multiple strike ignition circuit stops ceases operation (i.e., the multi-strike diac does not break). In other words, in embodiments described herein, except for failure of one or more components, it is only lamp ignition that triggers the cessation of further ignition strikes being sent to the electrodeless lamp. Further note that, in case of an electrodeless lamp in a dark environment, ignition may be, and sometimes is, achieved after many ignition strikes.

In some embodiments, the functionality of the output voltage detection circuit shown in FIGS. 1 and 2 is performed by a microcontroller that is part of the multi-strike ballast. The microcontroller operates based on software instructions, whether stored in a memory within the microcontroller or external to the microcontroller and/or ballast and otherwise connected thereto (e.g., via a network). In such embodiments, the microcontroller is capable of sensing the output voltage across the electrodeless lamp. In such embodiments, the microcontroller provides the multi-strike diac with the output voltage signal, as described herein, so that the multi-strike diac breaks or turns off, as is appropriate, either triggering further ignition strikes or ending further ignition strikes. Alternatively or additionally, in some embodiments, the microcontroller operates the switch of the inverter circuit, either directly based on software or indirectly based on discrete analog components controlled by the microcontroller, such that the switch of the inverter circuit is shorted or not, as is appropriate, triggering either the deactivation or activation of the inverter circuit. Thus, embodiment described herein may, and in some embodiments, do, use a microcontroller and associated hardware components and/or software instructions and/or both to perform the operations of the multiple ignition strike circuit and/or the output voltage detection circuit and/or portions and/or combinations thereof.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s) or smart cellphone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or an and/or the to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A multi-strike ballast to ignite an electrodless lamp, the multi-strike ballast comprising:

an inverter circuit configured to send an ignition pulse to the electrodeless lamp following activation of the inverter circuit, to shut down upon receiving a deactivation signal, and to activate upon receiving an activation signal;

an output voltage detection circuit configured to detect an output voltage across the electrodeless lamp; and an inverter shutdown circuit, wherein the inverter shutdown circuit includes a multi-strike diac, and wherein the inverter shutdown circuit is configured to receive the output voltage from the output voltage detection circuit, to break the multi-strike diac upon the output voltage reaching a predetermined level and in response to send a deactivation signal to the inverter circuit, and to turn off the multi-strike diac upon the output voltage falling below the predetermined level and in response to send an activation signal to the inverter circuit.

2. The multi-strike ballast of claim 1, wherein the inverter circuit includes a switch, wherein the switch is configured to control activation and deactivation of the inverter circuit and the ignition pulses sent thereby, wherein the multi-strike diac includes a first terminal and a second terminal, and wherein the inverter shutdown circuit further includes:

an RC circuit connected to the first terminal of the multi-strike diac;

a resistive divider circuit connected to the second terminal of the multi-strike diac;

a multi-strike capacitor connected to the resistive divider and configured to charge upon the breaking of the multi-strike diac and to discharge upon the turning off of the multi-strike diac; and a multi-strike switch connected to the multi-strike capacitor and to the switch of the inverter circuit, wherein the multi-strike switch is configured to turn on in response to the charging of the multi-strike capacitor to a threshold voltage and in response to short the switch of the inverter circuit, thereby deactivating the inverter circuit, and is configured to turn off in response to the discharging of the multi-strike capacitor below the threshold voltage and in response to un-short the switch of the inverter circuit, thereby activating the inverter circuit.

3. The multi-strike ballast of claim 2, wherein the RC circuit includes a detection capacitor configured to receive the detected output voltage of the electrodeless lamp and to charge to the predetermined level, wherein the detection capacitor is connected to the first terminal of the multi-strike diac.

4. The multi-strike ballast of claim 2, wherein the switch of the inverter circuit is a transistor, wherein the transistor includes a gate, a source, and a drain, and wherein the multi-strike switch is configured to turn on in response to the charging of the multi-strike capacitor to the threshold voltage and in response to connect the gate of the transistor of the inverter circuit with the source of the transistor of the inverter circuit, thereby deactivating the inverter circuit, and is configured to turn off in response to the discharging of the multi-strike capacitor below the threshold voltage and in response to disconnect the gate of the transistor of the inverter circuit with the source of the transistor of the inverter circuit, thereby activating the inverter circuit.

5. The multi-strike ballast of claim 1, wherein the output voltage detection circuit and the inverter shutdown circuit comprise a multiple ignition strike circuit.

6. The multi-strike ballast of claim 1, wherein the output voltage detection circuit comprises:

a feedback capacitor connected to a first terminal of the electrodeless lamp;

a first diode and a second diode in series, wherein the first diode and the second diode are in series with the feedback capacitor;

a capacitor in series with a third diode;

a feedback resistor in parallel with the capacitor and the third diode; and a fourth diode, wherein an anode of the fourth diode is connected between the capacitor and a cathode of the third diode.

7. The multi-strike ballast of claim 6, wherein the inverter circuit includes a switch, wherein the switch is configured to control activation and deactivation of the inverter circuit and the ignition pulses sent thereby, wherein the multi-strike diac includes a first terminal and a second terminal, and wherein the inverter shutdown circuit further includes:

an RC circuit connected to the first terminal of the multi-strike diac;

a resistive divider circuit connected to the second terminal of the multi-strike diac;

a multi-strike capacitor connected to the resistive divider and configured to charge upon the breaking of the multi-strike diac and to discharge upon the turning off of the multi-strike diac; and a multi-strike switch connected to the multi-strike capacitor and to the switch of the inverter circuit, wherein the multi-strike switch is configured to turn on in response to the charging of the multi-strike capacitor to a threshold voltage and in response to short the switch of the inverter circuit, thereby deactivating the inverter circuit, and is configured to turn off in response to the discharging of the multi-strike capacitor below the threshold voltage and in response to un-short the switch of the inverter circuit, thereby activating the inverter circuit.

8. A method of igniting an electrodeless lamp, comprising:

detecting a first output voltage of the electrodeless lamp, the electrodeless lamp having received a first ignition pulse from an activated inverter circuit;

breaking a multi-strike diac upon the detected first output voltage reaching a predetermined level;

deactivating the inverter circuit upon the multi-strike diac breaking;

detecting a second output voltage of the electrodless lamp;

turning off the multi-strike diac upon the detected second output voltage falling below the predetermined level;

reactivating the inverter circuit upon the multi-strike diac turning off; and sending a second ignition pulse to the electrodeless lamp.

9. The method of claim 8, further comprising:

repeating the steps of detecting, breaking, deactivating, detecting, turning off, reactivating, and sending, until the electrodeless lamp ignites.

10. The method of claim 8, wherein detecting a first output voltage comprises:

detecting a first output voltage of the electrodeless lamp, the electrodeless lamp having received a first ignition pulse from an activated inverter circuit; and providing the detected first output voltage to charge a detection capacitor to the predetermined level, wherein the detection capacitor is connected to the multi-strike diac such that the multi-strike diac is also provided the detected first output voltage.

11. The method of claim 10, further comprising:

delaying breaking the multi-strike diac by an RC circuit, wherein the RC circuit comprises the detection capacitor and an a resistor.

12. The method of claim 8, wherein deactivating comprises:

charging a multi-strike capacitor to a gate threshold voltage;

in response, turning on a multi-strike switch; and shorting a switch of the inverter such that the inverter is deactivated.

13. The method of claim 12, wherein shorting comprises:

connecting a gate of the switch of the inverter with a source of the switch of the inverter.

* * * * *